US012762237B2

(12) United States Patent
Ezrielev et al.

(10) Patent No.: US 12,762,237 B2
(45) Date of Patent: Oct. 13, 2026

(54) INTEGRATION OF INLINE MALWARE DISCOVERY AND OFFLINE VAULT RANSOMWARE PREDICTION

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 18/295,336

(22) Filed: Apr. 4, 2023

(65) Prior Publication Data

US 2024/0338449 A1 Oct. 10, 2024

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/034* (2013.01)

(58) Field of Classification Search
None
See application file for complete search history.

(56) References Cited

U.S. PATENT DOCUMENTS 8,839,434 B2 * 9/2014 McDougal ............ G06F 21/567 726/1
9,317,686 B1 * 4/2016 Ye ......................... G06F 21/568
11,755,420 B2 * 9/2023 Borate .................... G06F 21/56 714/15
2007/0067842 A1 * 3/2007 Greene ................. G06F 21/566 726/24
2014/0208426 A1 * 7/2014 Natarajan ............. G06F 21/562 726/23
2015/0172304 A1 * 6/2015 Kleczynski ......... H04L 63/1441 726/23
2015/0244732 A1 * 8/2015 Golshan ................ H04L 63/145 726/24
2018/0203999 A1 * 7/2018 Charters ............... G06F 21/565
2020/0042703 A1 * 2/2020 Herman Saffar ..... G06F 21/554
2021/0044604 A1 * 2/2021 Annen ................ G06F 11/1435
2023/0306108 A1 * 9/2023 Veprinsky ............ G06F 21/552

FOREIGN PATENT DOCUMENTS

WO WO-2012098018 A1 * 7/2012 ............. G06F 21/56

* cited by examiner

*Primary Examiner* — Eleni A Shiferaw
*Assistant Examiner* — Duilio Munguia
(74) *Attorney, Agent, or Firm* — Workman Nydegger

(57) ABSTRACT

One example method includes, by a first malware detection process, checking an aspect of a production system for evidence of a malware process, identifying the aspects as possibly affected by the malware process, generating cues that identify the aspect, and transmitting the cues to a second malware detection process. The second malware detection process checks the cues to identify the aspect, and determines that the malware process has affected the aspect. The first malware detection process may be an inline process, and the second malware detection process may be an offline process.

12 Claims, 4 Drawing Sheets

INTEGRATION OF INLINE MALWARE DISCOVERY AND OFFLINE VAULT RANSOMWARE PREDICTION

FIELD OF THE INVENTION

Embodiments of the present invention generally relate to malware detection. More particularly, at least some embodiments of the invention relate to systems, hardware, software, computer-readable media, and methods, for integrating inline/inline malware detection and offline malware detection.

BACKGROUND

In some current approaches, malware detection in production sites, such as sites where normal operations of a business entity are taking place, is performed inline as production operations take place. For example, new and modified data resulting from production operations may be checked for malware as, or soon after, that data is being stored and/or backed up to a data protection site. Later, the new/modified data may be checked for malware as it is being stored in a vault. However, the offline ransomware check being performed in the vault, and the inline ransomware check performed at the production site, do not collaborate or communicate with each other. In fact, the inline ransomware checking process and the offline ransomware checking process may not even be aware of each other. Further, some ransomware detection processes that are implemented in vaults are unable to check all the protected data, that is, the data in the vault and, accordingly, typically only check a subset of that data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
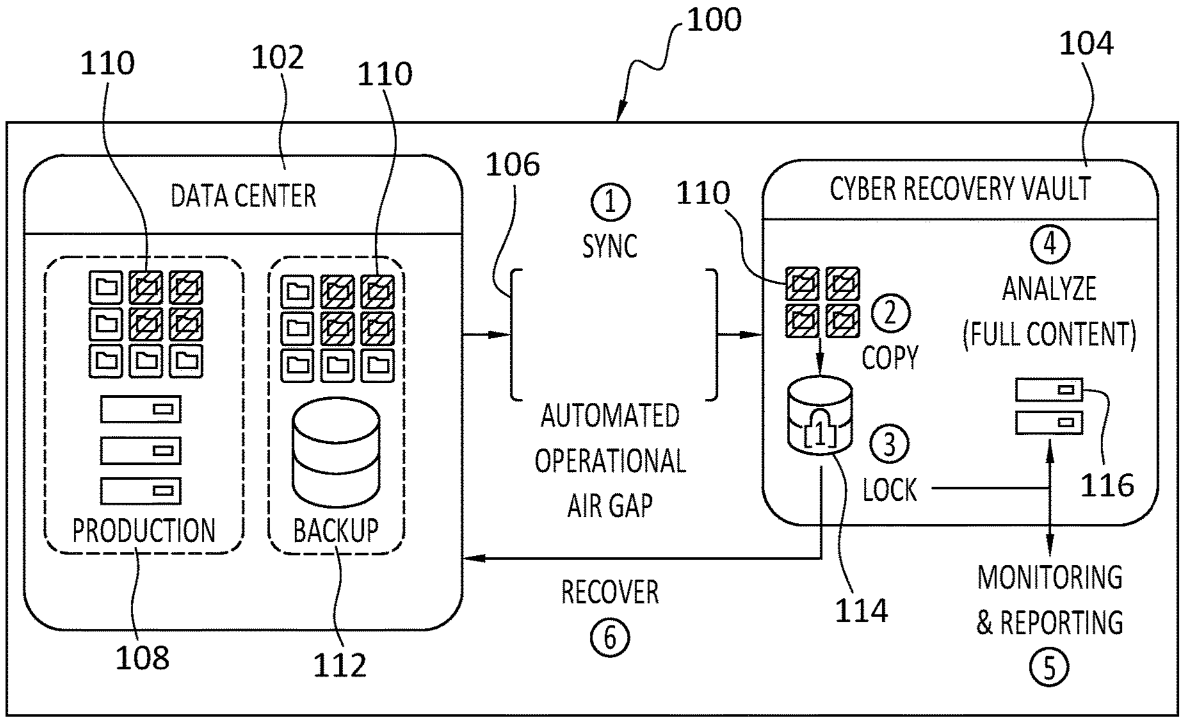
FIG. 1 discloses aspects of an example operating environment, according to one embodiment of the invention.

Embodiments of the present invention generally relate to malware detection. More particularly, at least some embodiments of the invention relate to systems, hardware, software, computer-readable media, and methods, for integrating inline/inline malware detection and offline malware detection.

In one embodiment, an inline ransomware detection process, or simply 'inline process,' may be running, such as at a production site, and an offline ransomware detection process, or simply 'offline process,' may also be running in a vault where backups from the production site may be stored. As the inline process checks data while a production process, an example of which is a data backup process, is being performed, the inline process may detect, in the data, operations and processes possibly indicative of the presence of ransomware. The inline process may accordingly send cues to the offline process to prioritize particular data for inspection by the offline process. For example, the cues may comprise metadata relating to the files with which the suspected ransomware process has interacted. If the offline and/or inline processes determine, by data inspection and/or another mechanism, that the suspicious process is in fact ransomware, then corrective measures may be taken.

In an embodiment, a near-line ransomware detection process, or simply 'near-line process,' may be performed. By way of contrast with an inline ransomware detection process, a near-line ransomware detection process may be performed after a production process, or may overlap with a production process. As noted earlier herein, one non-limiting example of a production process is a data backup process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a ransomware detection process may take a focused approach with respect to data that will be evaluated by that process for the existence of possible ransomware. An embodiment may identify data of particular interest to be evaluated by a ransomware detection process. An embodiment may provide for cooperation between inline and/or near-line, and offline, ransomware detection processes, to provide an integrated approach for ransomware detection. An embodiment may compensate for the inability of a ransomware process, given time constraints and/or other constraints, to inspect all data in storage, or a stream, for ransomware. Various other advantages of one or more example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts May be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, details are provided concerning aspects of an example operating environment 100 in which example embodiments may be employed. In the illustrative, and non-limiting, example of FIG. 1, a datacenter 102 is configured for communication with a vault 104 to which data from the datacenter 102 can be backed up. The vault 104, which may take the form of a Dell CyberRecovery vault for example, may be isolated from the datacenter 102, except under specified conditions, by a physical air gap 106. In general, the nature of the air gap 106 is such that when the air gap 106 is in place, that is, the air gap 106 is open, there is no physical or other connection between the vault 104 and the datacenter 102, thus ensuring the security and integrity of any data stored in the vault 104. Security procedures may be implemented that provide for selective closing of the air gap 106, for a limited time, so that the datacenter 102 and the vault 104 can communicate with each other. In at least some instances, the vault 104 may control the opening and closing of the air gap 106.

The datacenter 102 may include a production system 108 in which data 110 is generated. Some or all of the data 110 may be backed up to, or at least accessible by way of, a namespace in a backup environment 112 of the datacenter 102. In an embodiment, the backups of the data 110 may comprise one or more snapshots, which may be taken on a regular basis and/or some other temporal basis, and stored in the vault 104. That is, some or all of the data 110 in the namespace of the backup environment 112 may be replicated to the vault 104. In an embodiment, the vault 104 may include, or provide, a namespace 114 configured to receive a PIT (point in time) copy of the namespace that was replicated from the backup environment 112. Finally, the vault 104 may comprise a further namespace 116, which may be referred to herein simply as a 'sandbox' or 'sandbox namespace.'

Various operations may be performed in the operating environment 100, as described hereafter. The data 110 journey may begin when it is created or modified in the production system 108 and then backed up to a namespace in the backup environment 112. A subset of the data 110, such as a group of files, in the backup environment 112 may then be replicated over (1) to the vault 104. In general, the vault 104 may serve as another backup environment, and may be air gapped, as described earlier herein. After the data 110 has landed in the vault 104 namespace, a Point In Time (PIT) copy of that namespace may be copied over (2) to another namespace in the vault 104, and the copy then retention locked (3). At this stage, the infrastructure, that is the vault 104, guarantees immutability of the data stream. Next, this locked copy of the data 110 may be copied into another namespace, or sandbox. The data in the sandbox may be subjected (4) to an analyze routine, and that data and/or sandbox may also be subjected to monitoring and reporting (5), for example to determine, and report on, an outcome of the analysis (4). The analyze routine may comprise a ML algorithm which scans the data 110 in the sandbox for malware, such as ransomware for example. If any malware is detected, that is reported. If the scan does not reveal any problems, then the sandbox, that is, the namespace to which the locked data was copied, is marked as 'deleted' once the process is complete. At some point thereafter, the data in the vault 104 may be recovered (6) to the datacenter 110.

B. Further Aspects of Some Example Embodiments

Figure 2:
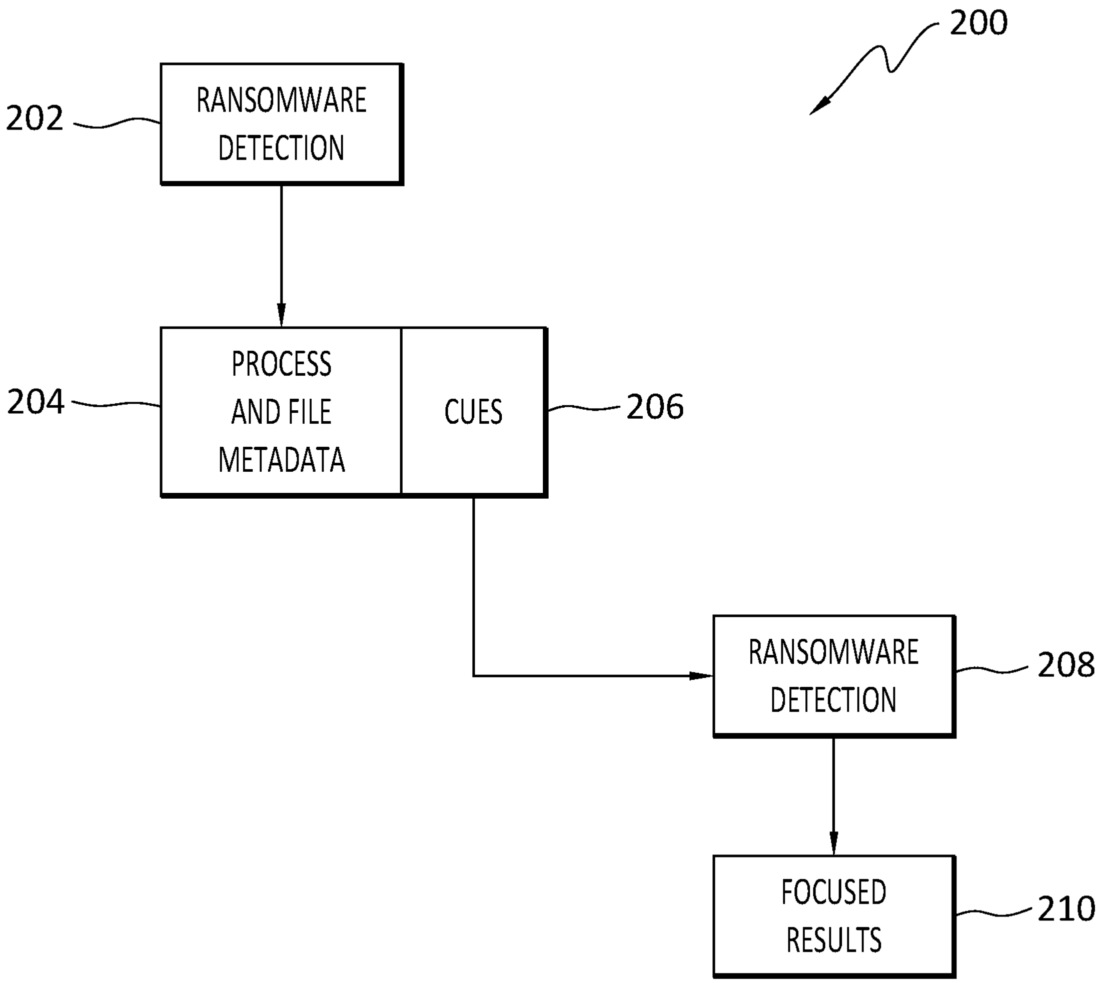
FIG. 2 discloses functional aspects of an example embodiment.

With attention now to FIG. 2, details are provided concerning various aspects of an embodiment of the invention. In an embodiment 200, a datacenter, such as the datacenter 102 referred to in FIG. 1, may comprise a ransomware detection platform 202. The ransomware detection platform 202 may inspect data at any time in the datacenter. For example, the ransomware detection platform 202 may perform any of: (1) inspect data as the data is created/modified at a production site, that is, inspect data in real time; (2) inspect data as the data is backed up and stored in backup storage; (3) inspect data in one or more data backups before those backups are sent to a vault; and/or (4) check any aspect of the operation of a production system. Thus, the ransomware detection platform 202 may inspect data inline as the data is created/modified/stored, and/or relatively near in time, that is, near-line, after any of these operations have been performed.

Processing 204 of data by the ransomware detection platform 202 may comprise looking at metadata, such as file metadata for example, to determine which process(es) has/have interacted with that data. An unknown or unrecognized process, for example, may be flagged as possible ransomware by the ransomware detection platform 202. The metadata may then be used by the ransomware detection platform 202 to generate cues 206. In an embodiment, the cues 206 may comprise the metadata itself. In general, a cue 206 may identify a grouping of data, such as one or more files for example, that have been assessed by the ransomware detection platform 202 as possibly having interacted with one or more ransomware processes.

The cues 206 may be transmitted by the ransomware detection platform 202 to a vault ransomware detection platform 208. In general, the ransomware detection platform 208 may inspect data, such as backups for example, as the data comes into the vault and/or after data is stored in the vault. The ransomware detection platform 208 may be referred to as performing an 'offline' ransomware detection process insofar as that process is not performed at a datacenter or at a production site.

The data to be inspected by the ransomware detection platform 208 may be prioritized according to the cues 206. That is, in an embodiment, data not identified by a cue 206 may be inspected only after cued data, that is, data that is referred to by a cue 206, is inspected, or possibly not at all. Put another way, cued data may be first priority for inspection by the ransomware detection platform 208, with uncued data a second priority. In this way, the ransomware detection platform 208, which may have a limited capacity to inspect data, is able to prioritize its processes according to the cues 206. Thus, in an embodiment, the ransomware detection platform 208 may inspect only a subset of the data in the vault, rather than all of that data. The ransomware detection platforms 208 and 202 may perform any process that may enable a determination as to whether data evaluated by one or both of the ransomware detection platforms 208 and 202 has been affected in any way by a process that may be ransomware.

In an embodiment, the ransomware detection platform 208 may perform an initial, high level, evaluation of data. Data identified as being of interest, that is, data that is indicative of possibly having been exposed to ransomware, may then be evaluated more in-depth by the ransomware detection platform 208. The outcome of processing of the data by the ransomware detection platform 208 may comprise a set 210 of focused results, that is, results specific to the cued data that was inspected. Such results 210 may comprise, for example, an indication that 'yes' a ransomware process touched the data, an indication that 'no' a ransomware process has not touched the data, or some intermediate result indicating a relative likelihood, but not necessarily a certainty, that the data was touched by a ransomware process, such as between 1 (low likelihood) and 5 (high likelihood).

C. Example Methods

Figure 3:
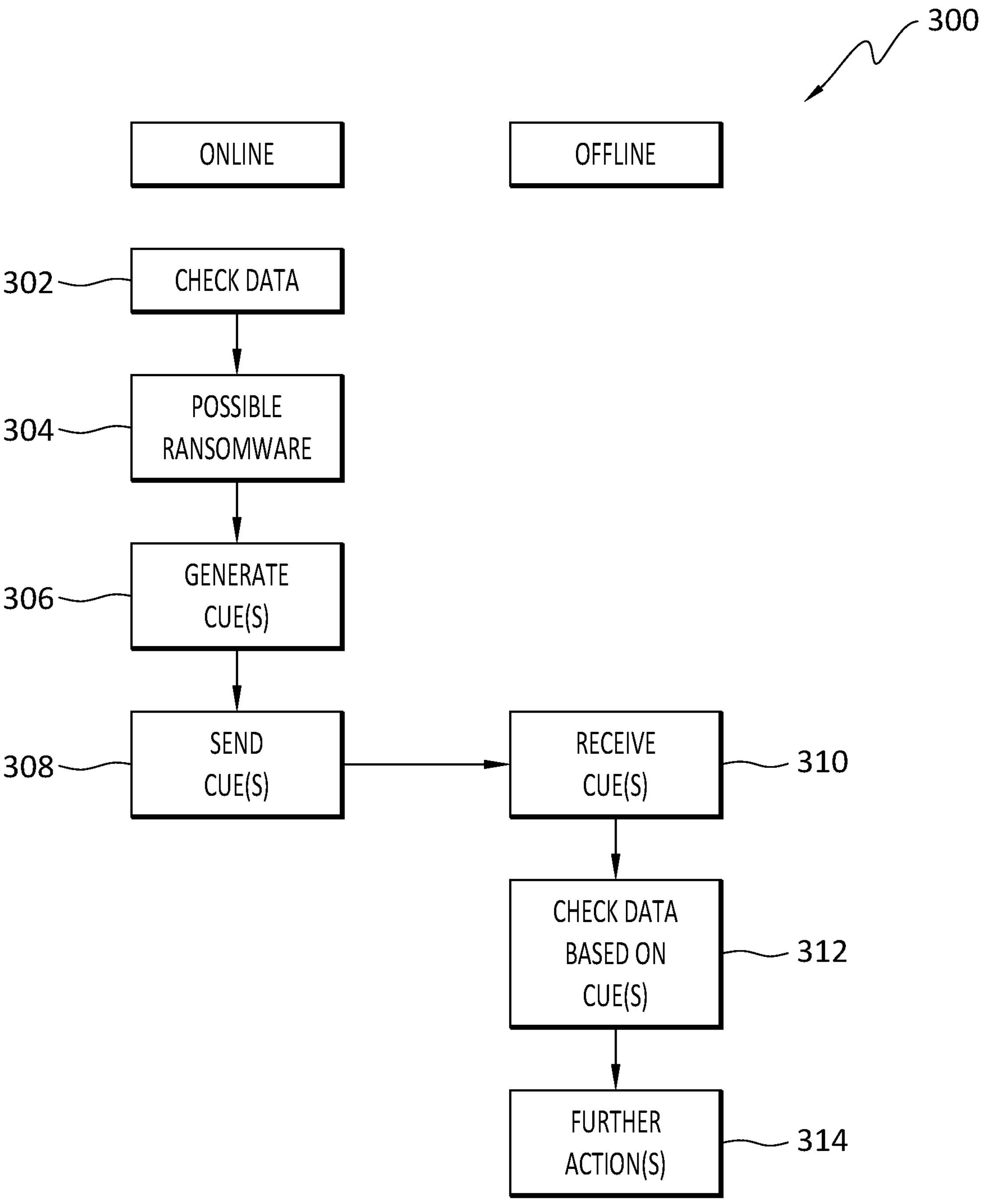
FIG. 3 discloses aspects of an example method, according to one embodiment of the invention.

It is noted with respect to the disclosed methods, including the example method of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, an example method according to one embodiment is denoted at 300. In an embodiment, the method 300 may comprise elements of an inline/near-line malware, such as ransomware for example, detection process, and also elements of an offline malware, such as ransomware for example, detection process. In one particular example embodiment, the inline/near-line portion of the method 300 may be performed at a datacenter, for example, and the offline portion of the method 300 may be performed at a storage site, such as a vault for example.

The example method 300 may begin at 302 where a ransomware detection process is performed that may comprise checking data, such as at a datacenter, for evidence that the data has interacted with a suspect process, such as a malware process for example. Such evidence may comprise, for example, metadata that identifies a process that has accessed, or attempted to access, the data. At 304, a possible ransomware process may be detected. A conclusion that the process is possible ransomware may be based on evidence, such as the aforementioned metadata. In an embodiment, the check 302 may comprise a simple binary indicate, either 'yes' the data may have been affected, or 'no' the data has not been affected. Deeper analysis of the 'yes' data may be performed by an offline malware detection process, running in a vault for example, as discussed below and elsewhere herein.

If possible ransomware is detected at 304, or if a process known to be ransomware is detected at 304, an inline portion of the method 300 may generate one or more cue(s) 306 and/or may take action to stop the suspect process if possible. The cues may indicate, for example, what file(s) and/or other groupings of data, such as backups for example, were affected by the process, or possibly affected by the process. In an embodiment, the cues may take the form of metadata about those files and groupings of data. The cues may also indicate when, such as by timestamp, the files were touched by the suspect process, for how long, and where the files were located in the datacenter when the interaction between the files and the suspect process took place. In an embodiment, the cues may take the form of an event stream that comprises some or all of the aforementioned information. Thus, for example, each cue or event in the event stream may have an associated timestamp and/or may correspond to a particular file, or other data grouping, with which the suspected process is known to have interacted at the datacenter or other site. In an embodiment, the cues may be generated 306 in real time as data is being checked 302 by the malware detection process running at the datacenter. Likewise, the event stream may be transmitted 308 in real time as the cues are being generated. In an embodiment, part or all the event stream may be buffered, such as at a datacenter, and later transmitted 308 after a time delay. The information in the buffer may be used later for analysis and for determining remedial actions.

In any event, the event stream may be received 310 by a malware detection process running offline in a data storage environment, such as a vault for example. The offline malware detection process may read the event stream and check 312 incoming, and/or stored, data identified by the event stream, to determine if that data has been affected by a ransomware process. In an embodiment, the offline malware detection process may perform a deeper and more thorough examination of the data than was performed at 302. In one non-limiting embodiment, the offline malware detection process may comprise an Index Engines CyberSense process, which may operate 312 to find data corruption that occurs when an attack has successfully breached the datacenter. In an embodiment, the malware detection process may leverage data backups, which may be stored in a vault for example, to observe how data changes over time and may then utilize analytics to detect signs of data corruption indicative of a ransomware attack.

Use of the cues in the event stream by the offline malware detection process may enable an embodiment of the invention to avoid the need for a brute force approach, which the offline malware detection process may not be capable of performing in any event, in which all the data coming into the vault is checked. Instead, in an embodiment, the offline malware detection process may only examine data identified by the cues and, as such, the offline malware detection process according to one embodiment may be performed relatively quickly and efficiently, at least as compared with a brute force approach or attempt.

After the data identified in the event stream has been checked 312 and analyzed, and a determination made that a ransomware attack has occurred, and/or is occurring, various further actions 314 may be taken. Such actions 314 may include, but are not limited to, stopping the ransomware process, suspending storage of data in the vault, and suspending creation and storage of data backups at the datacenter.

D. Further Example Embodiments

Following are some further example embodiments of the invention. These are presented only by way of example and are not intended to limit the scope of the invention in any way.

Embodiment 1. A method, comprising: by a first malware detection process: checking an aspect of a production process, such as data for example, for evidence of a malware process; identifying the data as possibly affected by the malware process; and generating cues that identify the data; transmitting the cues; and by a second malware detection process: checking the cues to identify the data; and determining that the malware process has affected the data.

Embodiment 2. The method as recited in any preceding embodiment, wherein the first malware detection process runs in a datacenter configured for communication with a vault.

Embodiment 3. The method as recited in any preceding embodiment, where the second malware detection process runs in a vault configured for communication with a datacenter.

Embodiment 4. The method as recited in any preceding embodiment, wherein identifying the data as possibly affected by the malware process comprises identifying data that has interacted with a process suspected to be the malware process.

Embodiment 5. The method as recited in any preceding embodiment, wherein the cues are transmitted by the first malware detection process to the second malware detection process.

Embodiment 6. The method as recited in any preceding embodiment, wherein the malware process comprises a ransomware process.

Embodiment 7. The method as recited in any preceding embodiment, wherein the second malware detection process does not check data other than the data identified by the cues.

Embodiment 8. The method as recited in any preceding embodiment, wherein the first malware detection process is an inline process.

Embodiment 9. The method as recited in any preceding embodiment, wherein the second malware detection process is an offline process.

Embodiment 10. The method as recited in any preceding embodiment, wherein the data checked by the second malware detection process is a subset of all data residing in a location where the second malware detection process runs.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
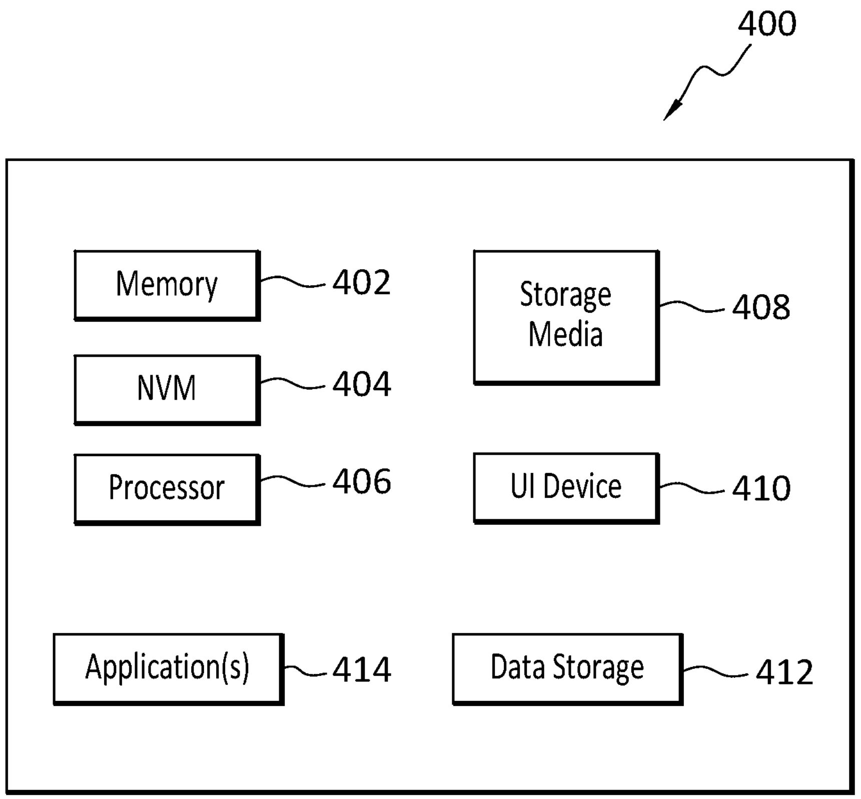
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

by a first malware detection process that is performed, at a datacenter, inline with a production data backup process as production data is being backed up from the datacenter to a vault:

in a production system that performs the data backup process, checking the production data, as the production data is being backed up to the vault, for evidence of a malware process;

identifying the production system as possibly affected by the malware process by identifying production data that has interacted with a process suspected to be the malware process; and generating one or more cues comprising metadata associated with the production data that has interacted with the suspected malware process, the one or more cues being generated in real time as the production data is being backed up, and the one or more cues prioritizing particular data, of the production data that is being backed up, for inspection;

transmitting the cues to the vault during the backup process; and by a second malware detection process that is performed at the vault, offline from the first malware detection process:

checking the cues to identify the particular data prioritized for inspection; and performing an offline inspection of the particular data identified by the cues, to the exclusion of uncued data during an inspection cycle, the offline inspection being deeper than the checking performed by the first malware detection process, and determining, based on the offline inspection, that the malware process has affected the production system.

2. The method as recited in claim 1, wherein identifying the production system as possibly affected by the malware process comprises identifying production data that has interacted with a process suspected to be the malware process.

3. The method as recited in claim 1, wherein the cues are transmitted by the first malware detection process to the second malware detection process.

4. The method as recited in claim 1, wherein the malware process comprises a ransomware process.

5. The method as recited in claim 1, wherein the second malware detection process does not check production data other than the particular data identified by the cues.

6. The method as recited in claim 1, wherein the particular data comprises a subset of all data residing in the vault where the second malware detection process runs.

7. A non-transitory storage medium having stored therein instructions that are executable by one or more hardware processors to perform operations comprising:

by a first malware detection process that is performed, at a datacenter, inline with a production data backup process as production data is being backed up from the datacenter to a vault:

in a production system that performs the data backup process, checking the production data, as the production data is being backed up to the vault, for evidence of a malware process;

identifying the production system as possibly affected by the malware process by identifying production data that has interacted with a process suspected to be the malware process; and generating one or more cues comprising metadata associated with the production data that has interacted with the suspected malware process, the one or more cues being generated in real time as the production data is being backed up, and the one or more cues prioritizing particular data, of the production data that is being backed up, for inspection;

transmitting the cues to the vault during the backup process; and by a second malware detection process that is performed at the vault, offline from the first malware detection process:

checking the cues to identify the particular data prioritized for inspection; and performing an offline inspection of the particular data identified by the cues, to the exclusion of uncued data during an inspection cycle, the offline inspection being deeper than the checking performed by the first malware detection process, and determining, based on the offline inspection, that the malware process has affected the production system.

8. The non-transitory storage medium as recited in claim 7, wherein identifying the production system as possibly affected by the malware process comprises identifying production data that has interacted with a process suspected to be the malware process.

9. The non-transitory storage medium as recited in claim 7, wherein the cues are transmitted by the first malware detection process to the second malware detection process.

10. The non-transitory storage medium as recited in claim 7, wherein the malware process comprises a ransomware process.

11. The non-transitory storage medium as recited in claim 7, wherein the second malware detection process does not check production data other than the particular data identified by the cues.

12. The non-transitory storage medium as recited in claim 7, wherein the particular data comprises a subset of all data residing in the vault where the second malware detection process runs.

* * * * *